United States Patent [19]

Kite, III

[11] Patent Number: 4,862,922

[45] Date of Patent: Sep. 5, 1989

[54] ABRASION RESISTANT SLEEVE FOR FLAT SUBSTRATES

[75] Inventor: Joseph S. Kite, III, Glenmoore, Pa.

[73] Assignee: The Bentley-Harris Manufacturing Company, Lionville, Pa.

[21] Appl. No.: 458,815

[22] Filed: Jan. 18, 1983

[51] Int. Cl.[4] .............................................. F16L 11/12
[52] U.S. Cl. .................................... 138/119; 138/118; 138/128; 138/123; 138/110; 138/178; 138/177; 174/86; 428/36.3
[58] Field of Search ............... 138/128, 119, 151, 156, 138/157, 178, 177, 118, 123, 124, 110 R; 174/DIG. 8, 124 R, 86, 69; 428/36, 36.3, 68 C

[56] References Cited

U.S. PATENT DOCUMENTS

| | | | |
|---|---|---|---|
| 31,614 | 3/1861 | Mayall | 138/128 X |
| 2,191,374 | 2/1940 | Dixon | 138/119 |
| 2,522,346 | 9/1950 | Carson et al. | 138/128 |
| 2,916,053 | 12/1959 | Klasing et al. | 138/128 |
| 3,032,151 | 5/1962 | Allen et al. | 138/128 X |
| 3,259,302 | 7/1966 | Rocchisani . | |
| 3,295,556 | 1/1967 | Gertsman et al. | 138/119 |
| 3,312,250 | 4/1967 | Sirignano et al. | 138/128 |
| 3,370,116 | 2/1968 | Wrede . | |
| 3,434,254 | 3/1969 | Rubin | 138/119 X |
| 3,939,875 | 2/1976 | Osborn et al. | 138/119 X |
| 3,996,968 | 12/1976 | Bergman et al. | 138/128 X |
| 4,131,137 | 12/1978 | Lustig et al. | 138/119 X |
| 4,271,329 | 6/1981 | Peremuter . | |
| 4,409,427 | 10/1983 | Plummer . | |
| 4,425,174 | 1/1984 | McLoughlin | 174/DIG. 8 |
| 4,425,390 | 1/1984 | Changani | 174/DIG. 8 X |

FOREIGN PATENT DOCUMENTS

| | | | |
|---|---|---|---|
| 225858 | 5/1958 | Australia | 138/119 |
| 2046398 | 9/1969 | Fed. Rep. of Germany . | |
| 2360387 | 12/1973 | Fed. Rep. of Germany . | |
| 937400 | 12/1946 | France . | |
| 2173770 | 10/1973 | France . | |
| 2471656 | 12/1979 | France . | |
| 190585 | 12/1922 | United Kingdom | 138/119 |
| 1098701 | 1/1968 | United Kingdom | 138/128 |
| 1323135 | 7/1973 | United Kingdom . | |

OTHER PUBLICATIONS

New Product Focus, Insulation/Circuits, Jan. 1972, p. 17, a copy of which can be found in class 174/DIG. 8.

*Primary Examiner*—James E. Bryant, III
*Attorney, Agent, or Firm*—John T. Synnestvedt; Charles H. Lindrooth

[57] ABSTRACT

An abrasion resistant sleeve for flat substrates, for example ribbon cable and the like, which includes a hollow flexible sleeve made from a fabric of engineering plastic that has been flattened to define two edges, each of which has a top and a bottom layer. The layers of each edge are bonded together permanently while the sleeve is in the flattened condition to maintain the sleeve in said condition. Preferably the sleeve is axially compressible and radially expansible.

7 Claims, 2 Drawing Sheets

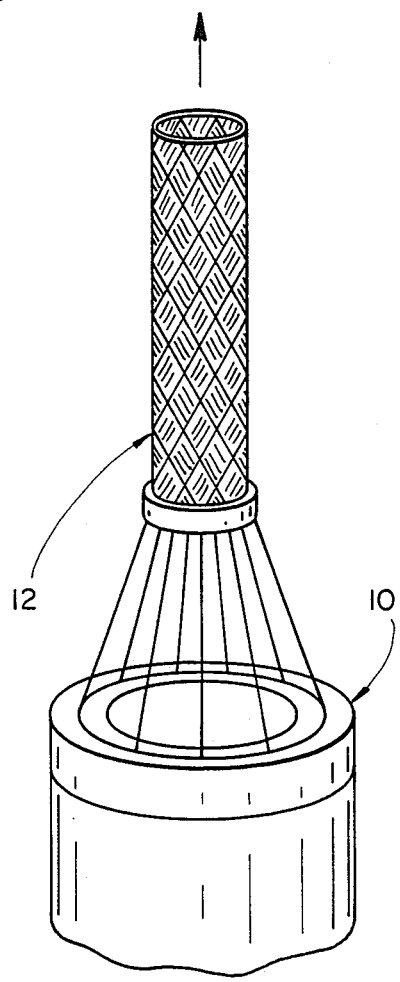
FIG_1
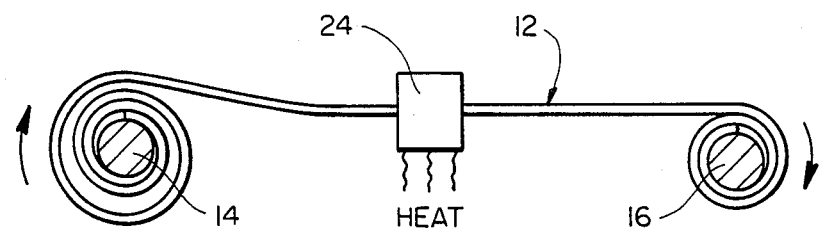
FIG_2

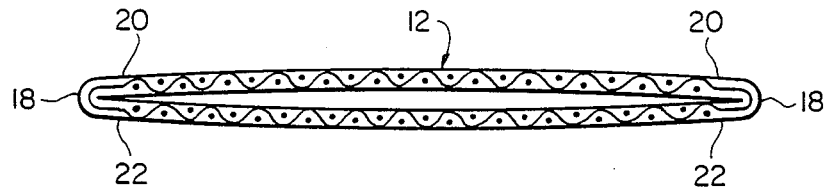
FIG_3
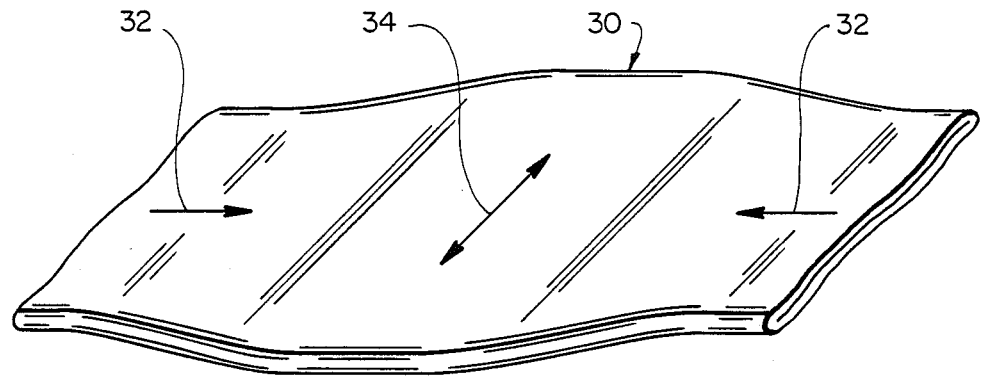
FIG_4
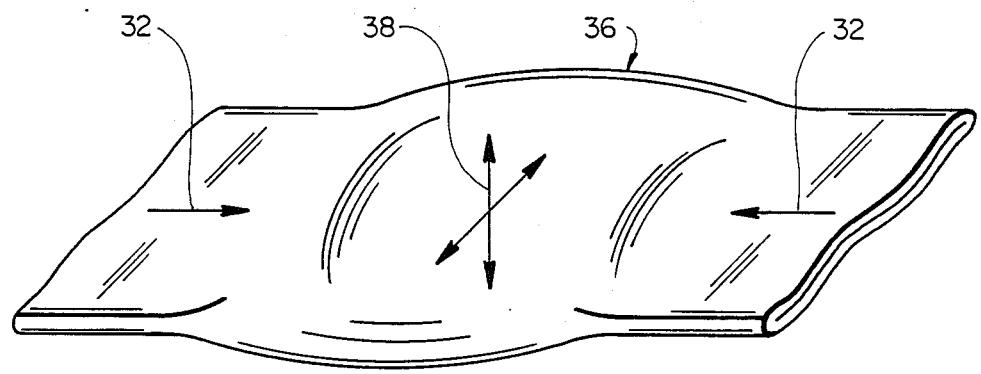
FIG_5
(PRIOR ART)

ABRASION RESISTANT SLEEVE FOR FLAT SUBSTRATES

FIELD OF INVENTION

This invention relates to abrasion resistant sleeves and to a method for making same. More particularly, the invention relates to such sleeves which are made from a fabric of engineering plastic.

BACKGROUND OF INVENTION

For some time now, manufacturers and users of cables and similiar articles have desired to protect their cables from the effects of abrasion. Abrasion inhibits the efficiency of a cable's performance and may lead to a total breakdown of a system employing such a cable. Additionally, safety considerations warrant that electrical cables and the like do not become abraided. Should an outer dielectric layer of a cable become frayed from abrasion, electrical power may become inadvertantly transmitted to the user of the system causing electrical shock or serious injury.

Abrasion stems primarily from two sources. The first source is during installation and use, objects may rub against a cable resulting in abrasion. The second source is other cables. It is very often desireable to bundle cables together. However, during installation or use one or more cables may be rubbed against one or more other cables in the the bundle which results in abrasion.

In order to satisfy industry needs with respect to both abrasion ane bundling there has been developed a number of products. One particular product is made by Bentley-Harris Manufacturing Company of Lionville, Pa. and sold under the federally registered trademark EXPANDO. EXPANDO sleeving is a braided tubular article made from a strong plastic material, such as polyester. The EXPANDO sleeving functions similiar to a "chinese finger" in that it is axially compressible and radially expansible and vice versa. In use, the cables or similiar articles are loaded into the sleeving by axially compressing the sleeve which causes the sleeve to radially expand. In addition, the overall length of the sleeving decreases in direct proportion to its radial expansion. As will be appreciated, this makes the loading operation considerably easier.

EXPANDO sleeving is very often used for bundling. A number of cables are loaded into the sleeving with the sleeve in its axially compressed and radially expanded condition. After loading, the sleeve is axially expanded and radially compressed to firmly hold the cables of the bundle in fixed relation to one another.

The EXPANDO sleeving prevents abrasion of the cable during installation by providing an outer surface other than the cable's own protective surface which can absorb the mechanical abuse of such installation. During use, the sleeving prevents one cable from rubbing against another cable by providing this protective outer layer between the cables. In bundling applications, the sleeving fixes the position of one cable relative to the another cable and thereby prevents internal bundle abrasion in use and installation.

While solving the above described problems quite satisfactorily, EXPANDO sleeving has been found to be lacking in one particular respect. As described above, when the sleeving compresses it radially expands. The radial expansion occurs generally in all directions and on an infinite number of planes. The radial expansion creates what amounts to buldge in the sleeving. When round cross-sectioned cable or other similiar articles are used, this buldge is not severe and is generally inconsequential. However, when flat cables or other similiar substrates are used, this buldging results in an inordinate amount of lost space.

Computer manufactures among others are greatly concerned with the efficient use of space. Very often the most limiting factor in computer hardware design is space. For this reason, among others, computer manufactures use ribbon cable or other flat cable. The telecommunications industry as well as other advanced technical industries such as robotics are also primary users of ribbon cable and the like flat substrates. Similiarly these advanced technical industries are often constrained by space requirements.

As will be appreciated by anyone looking at the rear of a computer mainframe, organization is critical. There are often tens of thousands of wires and literally hundreds of cable going from one place to the next. If the cables are disorganized and sloppy, a repairman's task may literally become impossible. Thusly, it is quite important to organize the cable and wire and present an organized appearance.

In order to solve the space and organizational problems of users of ribbon cable and other flat substrates, Applicant herein has developed the instant invention which comprises an abrasion resistant sleeve for flat substrates and a method of making same. In a preferred embodiment the sleeve is substantially similiar to EX-PANDO sleeving with the added feature that the expansion and contraction of the sleeve occurs substantially on the same plane thereby, saving space. The sleeving in accordance with this invention includes means for permanently maintaining the sleeve in a flattened condition through expansion and contraction. The method of making the instant sleeve in a preferred embodiment provides for drawing the sleeving to a flatten condition to form two edges, bonding the edges which defines the maintaining means above and cutting the sleeving to the desired length.

SUMMARY OF THE INVENTION

The purpose of this invention is to provide an abrasion resistant sleeve which is compatible with flat substrates such as ribbon cable and the like. By compatible it is meant that the sleeve of the instant invention can be used for abrasion protection in a space efficient manner. To accomplish this purpose, the instant invention provides a flexible hollow sleeve defining a fabric made from engineering plastic being flattened to form two edges. Each edge has a top and a bottom layer. There is further provided a means for maintaining the sleeve in a permanently flat condition which comprises bonding the layers of each edge together when the sleeve is in the flattened condition. Bonding, as used herein, is used in its broadest sense to mean holding, fastening, binding and the like and can include crimping, fusing, gluing, welding or any method of creating a permanent crease in the edges of the article and the like.

One aspect of the invention provides a sleeve which is axially compressible and radially expansible. In response to an axially compressive force the sleeve radially expands. However, of the maintaining means forces the expansion and contraction to occur substantially on the same plane.

Another aspect of the invention provides for a method of making the sleeving in accordance with this invention. The method includes making the sleeve by forming a hollow elongate article from a fabric of engineering plastic, then forming two edges in the article, preferably by drawing the article to its maximum extent. The two edges formed each have a top and a bottom layer. The method further includes after forming the edges, bonding the layers of each edge to one another and then cutting the sleeve to the desired length.

In other aspects of this invention, the method provides for continuously bonding the layers of each edge together to form a continuous edge bond. While in another aspect of this invention, the method provides for intermittantly bonding the edges.

It is an object of this invention to provide a method of making an abrasion resistant sleeve which expands and contracts in substantially a single plane when axially compressed or stretched.

It is a further object of this invention to provide an abrasion resistant sleeve and a method of making same which may be used as a bundling device.

These, and other objects and advantages of this invention will be appreciated hereinafter with reference to the accompanying drawing wherein:

IN THE DRAWING

FIG. 1 illustrates, in schematic, the hollow elongate article of the present invention being formed.

FIG. 2 illustrates, in schematic, the step of forming the edges of the article in accordance with the present invention.

FIG. 3 is a cross-sectional view of the article after the edges have been formed.

FIG. 4 illustrates the article in accordance with this invention in use.

FIG. 5 illustrates a prior art device in use.

DETAILED DESCRIPTION OF THE PREFERRED EMBODIMENT

Referring to the drawing wherein reference characters designate like or corresponding parts throughout the several view and referring particularly to FIG. 1 there is shown a braiding apparatus 10 forming a hollow elongate article 12.

While it is shown here and it is preferred that the article is braided, it will be appreciated that the article 12 can be made from any fabric. In this context fabric shall mean any woven, knitted, plaited, braided, felted or non-woven material made of fibers or yarns. The fabric can be knitted, made on a loom, needled, or constructed in some other fashion. The fiber of article 12 is a monoflament, but multifilament yarns and the like are also within the scope of this invention.

Preferably, the fiber or yarn used is polyester but it will be appreciated that any of the family of plastics known as engineering plastics are suitable. By engineering plastics, it is meant that the plastic has a tensile modulus of greater than 50,000 and preferably greater than 100,000 and more preferably greater than 150,000 and most preferably at least 200,000. Examples of engineering plastics are the olefin polymers of which are preferred high density polyethylene, polypropylene, polybutene-1, poly 4-methyl pentene and fluorinated polyolefins for example, ethylene-trifluorochloroethylene copolymers, ethylenetetrafluoroethylene copolymers, and vinylidene fluoride polymers, especially polyvinylidene fluoride, and blends thereof, for example, the fluorinated olefin blends as described and claimed in British Pat. No. 1,120,131, polyesters, for example, polyethylene terephthalate, polytetramethylene terephathalate for example that treated as described in British Pat. Specification No. 1,486,207, equivalent to U.S. Pat. No. 4,113,594 polyphenylene-oxide and -sulphide, blends of polyethylene oxide with styrene, silicone-carbonate block copolymers, polyketones, such as polyarylether ketones, for example, those described and claimed in British Pat. Nos. 1,387,303 equivalent to U.S. Pat. No. 4,229,564 and 1,383,393, polysulphones, for example, polyaryl sulphones, polyarylether sulphones, polyetherimides, for example those described in U.S. Pat. No. 3,847,867, polycarbonates especially those derived from bis phenol-A, polyamides, especially those described and claimed in British Pat. No. 1,287,932, equivalent to U.S. Pat. No. 3,677,921 epoxy resins and blends of one or more of the above mentioned polymeric materials either with each other or with other polymeric materials. A more detailed discussion of the above materials is found in British Specification No. 1,529,351 which is incorporated herein by reference.

Typically, when the article is braided it has a tubular configuration and is generally round in cross-section. As set forth previously, it is desirable for the article to have a flat cross-section. In order to create a flat cross-action, the article 12 is drawn in a process similiar to pultrusion.

The article 12 is loaded on a drum 14. One end of the article is connected to a second drum 16. There is a predetermined amount of resistance against drum 14. As drum 16 pulls the article 12, the article flattens and forms two edges 18, shown in FIG. 3. Each edge 18 includes a top layer 20 and a bottom layer 22. The article 12 is preferrably drawn so as to axially expand it to the maximum extent possible before it is subjected to over-tension.

Between drums 14 and 16, there is a bonding device 24, through which the article travels as shown in FIG. 2. The bonding device 24 permanently bonds the layers 20 and 22 of each edge 18 to each other. The currently used method includes using "V" shapes knives being heated to a temperature sufficient to fuse the plastic. There are at least two such knives, one for each edge 18. Each "V" shaped knife is placed in close proximity to the article causing the edge to melt and the layers 20 and 22 of each edge to fuse to each other when the knife is at a sufficient temperature.

Other bonding methods may of course be employed. It may be desirable to have the edges non-fused. This may be accomplished by hot crimping which involves heating, but not melting, the plastic under pressure and simultaneously crimping the layers 20 and 22 of each edge 18 together. Additionally, an ultrasonic welding device may be employed to bond the layers 20 and 22 together in a similiar manner to hot crimping.

In some applications, it may be desirable to form a continuous bond between the layers 20 and 22. In order to produce an article of this type, the bonding device would be continuously activated. For other applications, it may be desirable to produce an article which need be bonded at the edges only intermittantly. In this case the bonding device would be activated in the sequence desired.

After the process described in FIG. 2 has been completed, the article is cut to form a sleeve of the desired length.

With particular reference to FIG. 4, there is shown an abrasion resistant sleeve in accordance with this invention, generally indicated at 30. The sleeve is tubular and made from a fabric of engineering plastic as set forth above.

As discussed with reference to FIGS. 2 and 3, the tubular sleeve is flattened forming two edges, each having a top and a bottom layer. The sleeve further includes means for maintaining the sleeve in a flattened condition permanently. The maintaining means comprises bonding the layers of each edge together permanently when the sleeve is in a flattened condition. This may be accomplished by melting the edges as the sleeve is drawn from drum 14 to drum 16; hot crimping the edges; or ultrasonic welding of the edges or other suitable means.

Preferrably the sleeve is axially compressible and radially expansible. Thus, in response to an axially compressive force at either end of the sleeve 30 as indicated by the arrows 32, the sleeve radially expands as indicated at arrows 34. It will be appreciated that the expansion and contraction of the sleeve in accordance with the invention occur substantially in the same plane.

Flat substrates, such as ribbon cable or the like lie, may then be loaded into the sleeve. The user axially compresses the sleeve, loads in the ribbon cable, and releases the sleeve to allow axial expansion. It will be appreciated that when the sleeve is made in accordance with the preferred method above, it will be dimensionally recoverable. The sleeve 30 having been heat set (or otherwise having its edges bonded) in the axially expanded state (caused by drawing as described with reference to FIG. 2), will return to that state after the compression force has been released. The dimensional recovery of the sleeve causes it to conform to the shape of the substrate that has been inserted within it. This of course aids in protecting the substrate from abrasion as well as adding to the appearance of a bundle. As described in more detail above the dimensional recovery of the sleeve 32 also provides an efficient means for bundling a number of such substrates by the sleeve.

It has been found that the maintaining means is more necessary on sleeves having a diameter over ½ inch. For sleeves having a diameter of ½ inch or less, a non-permanent crease may be imparted to the sleeve with substantially satisfactory results. However, currently sleeves of one inch or more require a permanent maintaining means as set forth herein to function satisfactory.

With particular reference to FIG. 5, there is seen a prior art device 36. Initially the device 36 may lay flat or have a round cross-section as seen in FIG. 1. The device 36 is axially contractible and radially expansible in a manner similiar to the present invention. However, unlike the present invention, when an axially compressive force represented by arrows 32 is applied to device 36, radial expansion occurs over an infinite number of planes as indicated by arrows 38.

As stated earlier, the radial expansion of device 36 results in bulging. This bulging gives the structure of device 36 with substrate an unsightly presentation and takes up, wastefully, an inordinate amount of space. When using the instant invention as embodied in sleeve 30 with, flat substrates, this bulging does not occur and hence considerable amounts of space are saved.

While the instant invention has been described by reference to what is believed to be the most practical embodiments, it is understood that the invention may embody other specific forms not departing from the spirit of the invention. It should be understood that there are other embodiments which posses the qualities and characteristics which would generally function in the same manner and should be considered within the scope of this invention. The present emobdiments therefore should be considered in all respects as illustrative and not limited to the details disclosed herein but are to be accorded the full scope of the claims, so as to embrace any and all equivalent apparatus and articles.

I claim:

1. An abrasion resistant sleeve for a flat substrate which sleeve is axially compressible and expands and contracts in substantially a single plane when axially compressed or stretched and is made by the method which comprises the steps of:
   braiding a flexible hollow elongate sleeve from engineering plastic;
   flattening the sleeve to form two edges in the sleeve, each edge having a top and a bottom layer; and
   bonding at least a portion of the top and bottom layers of each edge to make the article permanently flat.

2. An abrasion resistant sleeve for a flat substrate, which sleeve is axially compressible and expands and contracts in substantially a single plane when axially compressed or stretched comprising:
   a flexible hollow sleeve braided from engineering plastic, the sleeve being flattened to form two edges, each edge having a top and a bottom layer, and
   means for maintaining the sleeve in a flat condition comprising permanently bonding at least a portion of the top and bottom layers of each edge together when the sleeve is flattened.

3. A sleeve as set forth in claim 2 wherein the sleeve is dimensionally recoverable.

4. A sleeve as set forth in claim 2 wherein the means for maintaining the sleeve in a flat condition comprises the layers of each edge continuously bonded together.

5. A sleeve as set forth in claim 2 wherein the means for maintaining the sleeve in a flat condition comprises the layers of each edge intermittantly bonded together.

6. A sleeve as set forth in claim 2 wherein the layers of each edge are bonded together by heat fusing.

7. A sleeve as set forth in claim 2 wherein the layers of each edge are hot crimped together.

* * * * *